(12) United States Patent
Brooker

(10) Patent No.: US 6,531,173 B2
(45) Date of Patent: Mar. 11, 2003

(54) PREPARATION OF FOOD PRODUCTS

(75) Inventor: Brian Edward Brooker, Reading (GB)

(73) Assignee: The BOC Group, plc, Windlesham (GB)

( * ) Notice: Subject to any disclaimer, the term of this patent is extended or adjusted under 35 U.S.C. 154(b) by 124 days.

(21) Appl. No.: 09/755,449

(22) Filed: Jan. 5, 2001

(65) Prior Publication Data

US 2001/0038872 A1 Nov. 8, 2001

(30) Foreign Application Priority Data

Jan. 6, 2000 (GB) ............................................. 0000159

(51) Int. Cl.$^7$ ................................................. A23D 9/00
(52) U.S. Cl. .......................... 426/524; 62/57; 426/417; 426/443
(58) Field of Search ................................ 426/524, 555, 426/580, 443, 417; 62/57

(56) References Cited

U.S. PATENT DOCUMENTS

| | | | |
|---|---|---|---|
| 3,892,880 A | | 7/1975 | Grolitsch |
| 4,675,197 A | * | 6/1987 | Banner et al. ............... 426/555 |
| 4,855,157 A | | 8/1989 | Tashiro et al. |
| 4,952,224 A | * | 8/1990 | Lilakos ........................ 62/57 |

FOREIGN PATENT DOCUMENTS

| | | |
|---|---|---|
| EP | 0 393 963 B1 | 10/1990 |
| WO | WO 00/09636 | 2/2000 |

OTHER PUBLICATIONS

N. Garti, "Stabilization of Water–in–Oil Emulsions by Sub-microcrystalline Form Fat Particles," AOCS Press, vol. 75 (No. 12), p. 1825–1831, (Jun. 8, 1998).

* cited by examiner

*Primary Examiner*—George C. Yeung
(74) *Attorney, Agent, or Firm*—Joshua L. Cohen; Salvatore P. Pace

(57) ABSTRACT

A method of forming a food product having therein a hydrogenated fat includes contacting a spray of the product in liquid form with a cryogen so as to cool the liquid product and effect a rapid conversion of the liquid product to a solid.

13 Claims, 1 Drawing Sheet

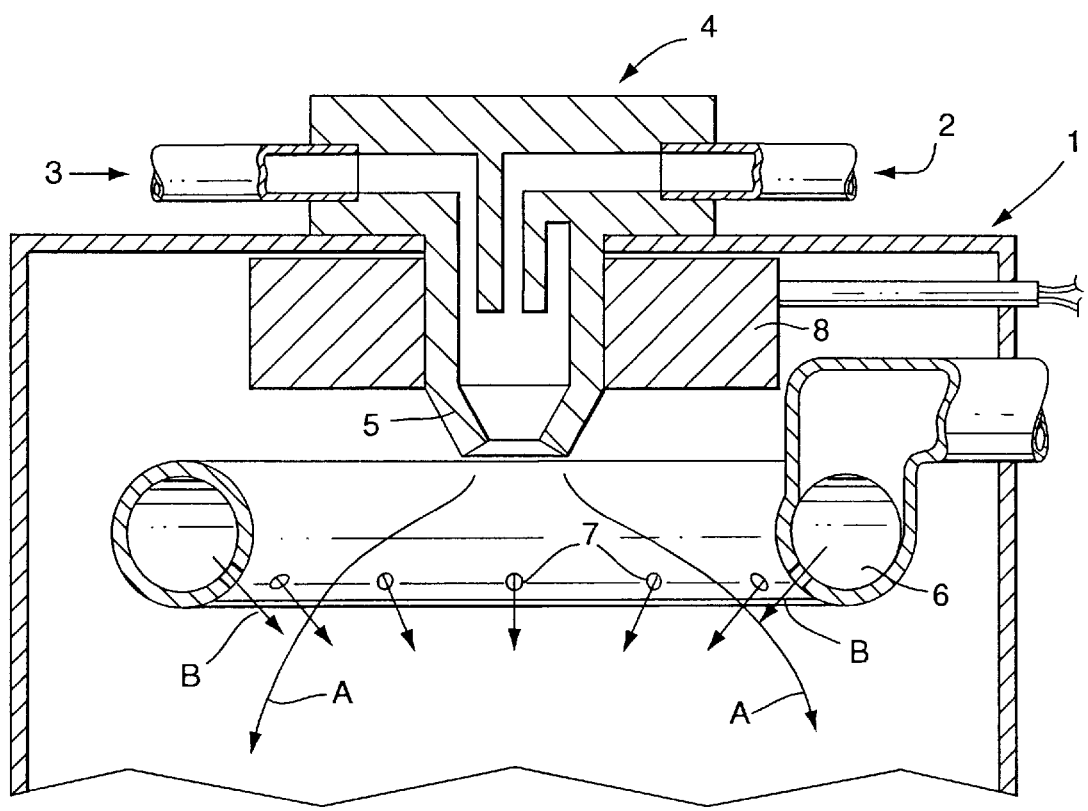

PREPARATION OF FOOD PRODUCTS

FIELD OF THE INVENTION

This invention relates to the preparation of food products which comprise or include hydrogenated fat.

BACKGROUND OF THE INVENTION

Hydrogenated fats, for example hydrogenated rape seed, hydrogenated palm oil and hydrogenated sunflower seed, are commonly used in the food industry in the production of spreadable food products including table margarine, dairy and non-dairy spreads and peanut butter and in the production of shortenings.

Shortenings in particular are used in the bakery industry in the production of bread, cakes, biscuits, pastries and the like. For reasons of taste and texture including an ability to control crumb structure in the final product, shortenings are designed to possess a predetermined proportion of fat crystals dispensed in a continuous or substantially continuous oil phase, for example 15% to 20% fat crystals in solid shortenings and 8% to 12% fat crystals in pumpable shortenings.

There are well known problems associated with the production of such shortenings and other food products incorporating hydrogenated fats. In particular, the required fat crystalline structure may be difficult to achieve in general and in any event may take such a long time that it imposes undesirable delays and costs in the manufacturing processes overall.

For example, table margarine or peanut butter is commonly produced using what is known as "scraped surface technology", in which a molten fat is brought in to contact with a cold surface, for example one cooled by mechanical refrigeration, where it crystallises and is scraped away so that more crystallisation can take place. There are various designs of scraped surface technology apparatus which usually share a common feature of a maximum cooling rate in the order of 400° C. to 600° C. per second. Applying such techniques to fats or to mixtures containing fats (such as typical peanut butter mixtures, for example) generally produces crystals of the fat having a particle size typically of 1 $\mu$m or more.

In addition, the solid fat phase in shortenings produced by scraped surface technology often continue to crystallise during storage, even when processing is followed by conditioning in cold storage before distribution. This means that shortenings used in baked products at different intervals after processing often contain different levels of solid fat and therefore have different functionality, giving rise to potential variations in the quality of the baked product.

Another common use for hydrogenated fats is as a stabiliser and to control texture in food products. Many products such as peanut butter contain an oil which is liquid at ambient temperature; there is a potential for phase separation to occur over time, which produces a layer of oil on the surface of the product and which therefore has the effect of lessening the "shelf life" of the product. This problem is usually addressed in commercial products by the addition of fat stabilisers composed of triglyceride or triglyceride/monoglyceride fat mixtures which have a crystalline structure at ambient temperatures; these additives dissolve in the oil phase when the product is hot and, on cooling, gradually crystallise in to a network which entraps the oil phase and thereby reduces the tendency towards phase separation. The presence of these crystals of fat and/or monoglycerides also increases the stiffness of the resulting mixture, which gives a set, or firm, product, and one which is less sensitive to handling or shearing, and having improved spreading properties. In the case of table margarines and dairy and non-dairy spreads, a similar process is designed to produce an aqueous phase dispersion in a network of crystals of fat and/or monoglycerides which provides good spreadability at room temperatures.

However, in all of these cases, the time required for a stable crystal network to build and for optimum firmness to be reached may take weeks, and the prolonged storage of a food product as an essential element of the manufacturing process is undesirable and costly to the food processing industry and leads to additional cost to the consumer.

The invention is concerned with an improved method for forming such food products which can generally overcome the difficulties described above with existing methods.

SUMMARY OF THE INVENTION

In accordance with the invention, there is provided a method of forming a food product which includes therein a hydrogenated fat, the method comprising contacting a spray of the product in liquid form with a cryogen so as to cool the liquid product and effect a rapid conversion of the liquid product to a solid.

The main aim of the invention is to provide small crystals of liquid fat and a correspondingly large number of these crystals dispersed in a liquid phase of the fat structure.

Preferably, the rate of cooling of the food product in the method exceeds 1000° C. per second, more preferably exceeds 2000° C. per second and is advantageously at least 5000° C. per second or at least 10000° C. per second or higher up to 40000° C. or 50000° C. or more.

The spray of liquid fat is advantageously formed by atomisation, preferably by urging the liquid fat through an atomising nozzle in communication with an external source of gas, for example air or nitrogen, under pressure.

The cryogen is preferably down to a temperature of at least minus 75° C., for example 79.8° C. of carbon dioxide snow, or more preferably down to at least minus 185° C., for example minus 194° C. of liquid air or minus 196° C. of liquid nitrogen. Temperatures between minus 75° C. and minus 185° C. may usefully be employed by mixing a cryogen, for example liquid nitrogen, with air.

The liquid food product is preferably directed in to the cryogen by causing the spray thereof to contact a spray of cryogenic liquid. More preferably, the spray of liquid food product is directed downwardly in to the spray of liquid cryogen which may itself be preferably directed substantially horizontally or upwardly in to a counter-current spray of the liquid food product. This latter method is generally known as "spray crystallisation" and is described in our European Patent Specification No. 0 393 963.

It has been found that the method of the invention, by virtue of its rapid cooling of the liquid food product, produces a product with a crystalline structure of fat particles dispersed in an oil phase which, by variation of the amount of cryogen employed and hence the rate of cooling of the liquid fat droplets, can produce a product with a minimum crystal size and a maximum number of such crystals per unit mass of solid fat in the product.

It has been found that a control of the cooling rate can provide a much smaller crystal size and a corresponding greater number of crystals than can be produced using conventional methods in the food industry. Typically, the crystal size should be 0.5 $\mu$m or less, ideally 0.1 $\mu$m or less.

Because the invention produces such rapid crystallisation, no ordered crystal network is formed and therefore re-crystallised fats are typically shear stable. Also, the multiplicity of very small crystals so formed confers stable Theological properties on the product once it has been brought to ambient temperature. Scraped surface technology processes initiate crystallisation of fat, but the process may continue slowly for days or weeks. This is very significant as the invention can greatly reduce if not obviate the time a food product needs to be stored before it can be used. In preferred embodiments of the invention the product, which after cooling is in particulate form, is brought to ambient temperature and either introduced directly in to a mixture of other food ingredients or mechanically worked (by conventional means such as a pinworker, which produces an extruded plastic solid) and can immediately be introduced in to containers for sale or use, because the completion of crystallisation of the hydrogenated fat is so very rapid.

The invention has been found to be applicable to all hydrogenated fats including hydrogenated rape seed, hydrogenated soya bean, hydrogenated palm oil, hydrogenated sunflower oil and hydrogenated cotton seed. The term "hydrogenated fats" when used herein include those fats which are particularly hydrogenated with a minimum of 5%, more preferably at least 10%, hydrogenation.

Generally, therefore, it has been discovered that the application of rapid cooling rates in accordance with the invention provides a much greater number of crystals of consistent and much smaller average size—typically no more than 0.5 $\mu$m—than can be produced utilising conventional cooling process as are used in known food processing methods. This finding provides the basis for reducing the fat content of a variety of foods such as baked products, margarines, dairy and non-dairy spreads, peanut butter, biscuit cream fillings and many more without adversely affecting appearance or organoleptic properties. Moreover, the method of the invention promotes rapid crystallisation, so that the final solid fat content is reached immediately the product is brought to ambient temperature. Crystallisation does not continue over an extended period of time, and therefore the need for costly storage of the products so that crystallisation can take place is obviated.

In addition to the much smaller average size, preferably of no more than 0.5 $\mu$m, of the average crystalline particle of fat produced by the method of the invention, there is a significant increase in the overall solid fat content of hydrogenated fat, up to 100% increase over the solid fat content achieved using known methods, for example scraped surface technology. This has considerable advantages for food manufacturers, since this also allows less hydrogenated fat to be used in products such as baked products, margarines, dairy and non-diary spreads, shortenings, peanut butter, biscuit creams and many more, to provide the same effect. Thus, whether the hydrogenated fat is used as a stabiliser or for some other effect which is ultimately dependent on its solid fat content, up to 50% less hydrogenated fat need be used. This has significant cost implications for food manufacture; there are also important health implications, because hydrogenated fats have high calorific value and contain saturated fatty acids which are held to be harmful in excess and so any means by which these can be reduced is highly desirable.

Food products made by the method of the invention therefore allow for a number of significant advantages for the food industry, in particular:

i) they have increased functionality, particularly in baked products, by virtue of their elevated solid fat content and reduction in fat crystal size. Therefore they can be used in the amounts stipulated by conventional formulations to give an increase in volume, improved crumb structure and uniformity of product quality, provided that the mixing regime used is able to produce a uniform dispersion of the fat throughout the dough/batter used in the baked products.

ii) the increased solid fat content increases the functionality of the food product so that lower levels of the fat can be used than those stipulated by conventional formulations to produce products which have the same appearance and organoleptic properties as normal products.

iii) by reducing the amount of solid fat in the product by replacing it with oil before or after applying the method of the invention, a product can be produced which has the same or similar functionality as conventional ones as well as the same or similar solid fat content. However, there is i) a saving in the amount of the more expensive solid fat used, without sacrifice of functionality and ii) an improvement in the nutritional quality of the product by replacement of the solid fat by an oil containing the more desirable saturated fatty acids.

Thus, it is possible, for example, to formulate fat-rich biscuit cream fillings and similar products used by the baking industry so that they contain less solid fat than is stipulated by conventional formulations. Thus, a typical biscuit cream filling composed of 47% icing sugar, 46.5% fat (partially hydrogenated rape seed oil having a solid fat content of 51 % at 20° C.) and minor ingredients including flavourings and colourants had similar rheological properties and similar stability as the same formulation containing re-crystallised product whose solid fat content had been reduced to 29% by the addition of unsaturated oil.

iv) Hydrogenated fats which are processed by the invention complete the crystallisation of the solid fat phase immediately after processing once they have been brought to ambient temperature and are extremely stable on storage. Therefore, their use in the production of, for example, baked products does not give rise to the variations in quality with time as often seen in products containing conventionally processed fats.

BRIEF DESCRIPTION OF THE DRAWING

For a better understanding of the invention, reference will now be made, by way of exemplification only, to the accompanying drawing showing spray crystallisation apparatus for carrying out the method of the invention and additionally describing specific examples of the fat content of different fats processed in the apparatus.

DETAILED DESCRIPTION OF THE INVENTION

With reference to the drawing, there is shown the principal parts of a spray crystallisation apparatus in which, in particular, an atomised food product spray and a cryogen spray are produced and caused to impinge with each other. The apparatus is particularly suited to the use of liquid nitrogen as the cryogen.

The apparatus shows a cryogenic spray crystallisation head having a body portion shown generally at 1 and, an inlet 2 for the supply of liquid fat thereto and an inlet 3 for the supply of pressurised air thereto. Inlets 2 and 3 lead to an atomising nozzle arrangement 4 top mounted in the body 1 which is designed to break up liquid fat introduced to it in to very small droplets when the fat and air are simultaneously introduced. Commercially available "Venturi" nozzles are preferred. Valves (not shown) are present to control the flow of pressured air and liquid food product to a nozzle outlet 5.

The resulting spray of atomised liquid food product is shown schematically at 'A'.

Surrounding the position of the spray A is a hollow cryogen spray ring 6 with a diameter, for example 20 cm, sized to surround the anticipated spray maximum size and being concentric with the nozzle 4. The inner and lower surfaces of the spray ring 6 are drilled with an evenly spaced array of small holes 7 selected to suit the flow rates of fat, the required rate of cooling of the fat particles, etc.

The spray of liquid cryogen is represented by the arrows 'B' which generally converge downwardly and inwardly of the ring 6.

A heating element 8 is present about the nozzle 4 and terminating above the nozzle outlet 5 to prevent the fat being injected therethrough from solidifying within the nozzle. The amount of heat supplied is regulated and controlled to a desired temperature by a voltage controller (not shown).

A further heat may be employed around the body portion 1 to prevent any fat from building up on the sides of the apparatus.

In use of the apparatus, the cryogen spray therefore impinges on the liquid food product spray and causes a very rapid cooling rate on the food product. Solidified food product fall to the base of the apparatus (which may include a plurality of such body portion/spray arrangements) and may be removed therefrom by means, for example, of driven auger.

The rate of cooling of the liquid food product can conveniently be calculated by known means with particular reference to parameters including the particle size of the fat, the temperature of the fat, the specific heat of the fat, the velocity of the fat particles and the temperature of the cryogen.

The apparatus shown in the drawing can be readily modified by skilled engineers to suit the use of carbon dioxide snow, liquid air or mixtures of nitrogen with air as alternative cryogens.

A variety of hydrogenated food products were processed in accordance with the invention using the illustrated apparatus and compared with unprocessed products as described in the following examples.

EXAMPLE I

A very smooth commercial product composed of the following proportions (by weight): roasted peanuts 87.5%, vegetable oil 5.0%, sugar 4.0%, hydrogenated rape seed oil 2.5%, salt 1% was re-crystallised in the apparatus described above at a rate of cooling of about 10500° C. per second calculated by means of the parameters described above and including a product particle size of 150 im and a product temperature of 70° C. After re-crystallisation, its firmness (maximum force for penetration) was measured before and after working using cone penetrometry (60 degree cone angle, 20 mm penetration, drive speed 10 mm/min). The start temperature was 20° C., and the end temperature was 21° C. Six samples were tested of both a "standard product" and a "re-crystallised product" in accordance with the invention, all before and after re-working. Re-working means vigorous stirring for two minutes. The results are shown in Table 1.

TABLE 1

|  | STANDARD PRODUCT | | RE-CRYSTALLISED PRODUCT | |
| --- | --- | --- | --- | --- |
|  | At start | After re-work | At start | After re-work |
| Mean Firmness (grams force) | 260.0 | 66.5 | 386.3 | 137.0 |

These results show that fats composed of hydrogenated vegetable oil undergo a significant increase in their solid fat index (up to 100% increase) when cryogenically re-crystallised. This leads to a large increase in the hardness of the fat and in the hardness of peanut butter when it is included in the formulation. These stabilisers can therefore be used in reduced concentrations in the peanut butter to produce a product which has the same firmness as a conventionally processed peanut butter and in which the oil dispersion is stable, even after working.

These results show that:
1. Application of the invention followed by working and filling produces a set peanut butter whose final firmness is reached immediately after filling.
2. Irrespective of the hydrogenated fat stabiliser used, oil separation does not occur, even after vigorous working.
3. When hydrogenated fat is included as a stabiliser in peanut butter, re-crystallisation by the invention leads to a sharp increase in solid fat content compared with products processed by scraped surface technology. Thus, peanut butter processed in this way is significantly firmer and more stable (no oil separation) than the standard product and is much more resistant to working. This means that butters with the same firmness as standard products can be prepared in accordance with the invention using smaller amounts of hydrogenated fat in the formulation.

EXAMPLE II

It has been found that when the fats are melted and re-crystallised using the process of this invention, the fats become harder. This hardening occurs because of a significant increase in the solid fat content and the formation of very large numbers of fat crystals less than 0.5 μm. However, the increase in solid fat content, and hence its hardness, depends on the fatty acid composition of the oil used in the hydrogenation process and on its degree of hydrogenation, and hence its degree of saturation. It has been observed that as the degree of hydrogenation (saturation) of fats increases, re-crystallisation in accordance with the invention increases the solid fat content at progressively higher temperatures.

Typical examples showing the solid fat content (SFC) of standard commercial fats measured at different temperatures against the same materials treated in accordance with the invention (re-crystallised fat) are shown in Table 2.

TABLE 2

|  | Rape seed low hydrogenation | Rape seed intermediate hydrogenation | Rape seed high hydrogenation | Hydrogenated Palm Oil |
| --- | --- | --- | --- | --- |
| Iodine Value | 85.0 | 72.9 | 53.9 | 40.0 |
| Standard Product | SFC | SFC | SFC | SFC |

TABLE 2-continued

|  | Rape seed low hydrogenation | Rape seed intermediate hydrogenation | Rape seed high hydrogenation | Hydrogenated Palm Oil |
|---|---|---|---|---|
| 10° C. | 7.7 | 60.0 | 81.2 | 74.5 |
| 20° C. | 1.1 | 50.8 | 71.5 | 58.6 |
| 30° C. | 0 | 38.1 | 60.7 | 43.6 |
| 35° C. | 0 | 16.5 | 54.3 | 36.1 |
| 40° C. | 0 | 0 | 38.7 | 24.0 |
| Re-crystallised fat | SFC | SFC | SFC | SFC |
| 10° C. | 10.2 | 72.8 | 90.7 | 81.3 |
| 20° C. | 1.1 | 67.2 | 88.2 | 76.6 |
| 30° C. | 0.2 | 39.1 | 77.1 | 58.5 |
| 35° C. | 0.1 | 16.6 | 64.3 | 41.8 |
| 40° C. | 0.1 | 5.6 | 42.3 | 23.7 |

Hydrogenated fats with an elevated solid fat content have not, it is believed, been available before. Accordingly, the invention extends to any food product containing at least 1% by weight of such hydrogenated fat.

It is believed that the effects of the invention are applicable to those hydrogenated fats which are already commonly available in hydrogenated form (for whatever purpose), for example soya oil, rape seed oil, cotton seed oil, sunflower oil, peanut oil but is not applicable to those fats which are not hydrogenated, for example almond oil, coconut oil or avocado oil and the like, unless they are artificially hydrogenated before processing in accordance with the invention.

I claim:

1. A method of forming a food product which includes therein a hydrogenated fat, the method comprising: providing a spray of the food product in liquid form; contacting the spray with a cryogen for cooling the spray and effecting a rapid conversion of the liquid food product to a solid; and controlling a cooling rate of the cryogen contacting the spray for controlling the cooling of the food product.

2. The method according to claim 1 wherein the rate of cooling exceeds 1000° C. per second.

3. The method according to claim 1 wherein the rate of cooling exceeds 5000° C. per second.

4. The method according to claim 1 wherein the rate of cooling exceeds 10000° C. per second.

5. The method according to claim 1 wherein the spray is formed by atomisation.

6. The method according to claim 5 wherein the spray and the cryogen are mixed by spray crystallisation.

7. The method according to claim 1 wherein the cryogen is at a temperature of at least minus 75° C.

8. The method according to claim 7 wherein the cryogen is at a temperature of at least minus 185° C.

9. The method according to claim 1 wherein a solid is formed comprising fat crystals having a size not greater than 0.5 $\mu$m dispersed in an oil phase.

10. The method according to claim 9 wherein the size of the fat crystals is not greater than 0.1 $\mu$m.

11. The method according to claim 1 wherein said hydrogenated fat is at least 5% hydrogenated.

12. The method according to claim 1 wherein said hydrogenated fat is at least 10% hydrogenated.

13. The method according to claim 1 wherein said hydrogenated fat is selected from the group consisting of hydrogenated rape seed, hydrogenated soya bean, hydrogenated palm oil, hydrogenated sunflower oil and hydrogenated cotton seed oil.

* * * * *